(12) United States Patent
Efimov (10) Patent No.: US 7,349,089 B1
(45) Date of Patent: Mar. 25, 2008

(54) HIGH TRANSMISSION MULTI-WAVELENGTH FILTER AND METHOD

(75) Inventor: Oleg M. Efimov, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 379 days.

(21) Appl. No.: 11/170,292

(22) Filed: Jun. 28, 2005

(51) Int. Cl.
*G01J 11/00* (2006.01)
*G01B 5/30* (2006.01)

(52) U.S. Cl. ............ 356/368; 359/485; 359/615; 359/339; 359/629

(58) Field of Classification Search ........ 356/368–370; 359/485, 494–500, 615, 339, 629; 398/65
See application file for complete search history.

(56) References Cited

U.S. PATENT DOCUMENTS

| | | | | |
|---|---|---|---|---|
| 5,222,095 A * | 6/1993 | Zediker et al. | ............ | 372/108 |
| 5,825,520 A * | 10/1998 | Huber | ............ | 398/87 |
| 6,396,609 B1 * | 5/2002 | Cheng et al. | ............ | 398/158 |
| 6,552,467 B1 * | 4/2003 | Suriano et al. | ............ | 310/249 |
| 6,687,423 B1 * | 2/2004 | Yao | ............ | 385/11 |
| 6,781,757 B2 * | 8/2004 | Cormack | ............ | 359/578 |
| 6,804,057 B1 * | 10/2004 | Vakoc | ............ | 359/485 |
| 6,847,786 B2 * | 1/2005 | Wong et al. | ............ | 398/65 |
| 6,965,472 B2 * | 11/2005 | Efimov et al. | ............ | 359/484 |
| 7,031,060 B2 * | 4/2006 | Mao et al. | ............ | 359/494 |
| 2005/0157397 A1 | 7/2005 | Efimov et al. | | |

* cited by examiner

*Primary Examiner*—Layla G. Lauchman
(74) *Attorney, Agent, or Firm*—Christie, Parker, Hale (57) ABSTRACT

An optical arrangement and method of filtering include a beam splitter that accepts an incident beam and transmits light from the incident beam of a first polarization and reflects light from the incident beam of a second polarization. The transmitted light is a first beam and the reflected light is a second beam. A first spectral filter, receives the first beam, reflects a first spectral band of the first beam, and transmits the remainder of the first beam. A second spectral filter receives the remainder of the first beam and reflects a second spectral band of the first beam. The first and second spectral filters can also receive the second beam and reflect similar first and second spectral bands. The spectral bands are then returned to the beam splitter, where they may be directed toward a dispersal element or an array of photodetectors.

21 Claims, 9 Drawing Sheets

HIGH TRANSMISSION MULTI-WAVELENGTH FILTER AND METHOD

BACKGROUND

Narrow-band optical filters are commonly used in many fields, such as remote sensing, optical astronomy, spectroscopy, and optical communication. These filters isolate a narrow spectral band from a wide spectral band radiation source and unwanted background light sources. Isolation of a narrow spectral band may aid in detecting a particular characteristic from a subject to be investigated or in multiplexing or demultiplexing channels in optical communication.

Existing narrow-band filters typically use a dispersing system and an array of photodetectors, such as a charge coupled device (CCD), to separate a beam into several spectral bands of the size $\Delta\lambda$. Each spectral band is detected by a separate photodetector. The array of photodetectors, therefore, detects a desired spectral region, $\Delta\Lambda$.

Generally, if a greater resolution of a spectral band is needed, the size $\Delta\lambda$ of each spectral band is decreased, causing the total spectral region $\Delta\Lambda$ to also decrease. Thus, only bands close to each other on the spectrum are detected by the array at high resolution. Applications requiring high resolution detection of widely separated spectral bands can therefore be difficult. Another problem with these conventional narrow-band filters is that high resolution can require a small solid angle of detection, thus limiting sensitivity.

Other devices for narrow-band detection of selected spectral lines include Fabri-Perot etalons or interference filters. Although these devices may detect narrow spectral bands, they have a high angular selectivity, which decreases their sensitivity. Further, they typically use special glass filters for mirror substrates that cause the filters to operate at only one wavelength. Thus, only a single spectral line is detected.

Another type of spectral filter is a Bragg grating (BG). BGs can also have strong angular selectivity, causing insensitivity. This problem was addressed by G. A. Rakuljic, V. Leyva, "Volume Holographic Narrow-Band Optical Filter," Opt. Lett., v. 18, pp. 459-461, 1993 ("Rakuljic"). Use of spectral filters, such as Rakuljic, however, teaches introduction of a beam splitter between the incident light and a holographic filter, reducing the post-filter signal power to a quarter of what it would be without the beam splitter. Further, a portion of the beam reflected off of the holographic filter may return to the source of the incident beam, which can be strongly undesirable.

Accordingly, a need exists for a narrow band filter that can detect a set of pre-selected wavelengths at high resolution through a single receiving channel. A further need exists for a filter that can detect pre-selected wavelengths that are spectrally distant from each other. Needs also exist for a filter with a wide angular field of view and high sensitivity at a variety of angles of incident light. These and other needs are addressed by one or more embodiments of the present invention.

SUMMARY

An optical arrangement according to an embodiment of the instant invention includes a first beam splitter that accepts an incident beam and transmits light from the incident beam of a first polarization and reflects light from the incident beam of a second polarization. The transmitted light is a first beam and the reflected light is a second beam.

The arrangement in this embodiment also includes a first spectral filter, such as a Bragg grating, that receives the first beam, reflects a first spectral band of the first beam, and transmits the remainder of the first beam. A second spectral filter receives the remainder of the first beam and reflects a second spectral band of the first beam. A first polarization rotator rotates the polarization of the first and second spectral bands to the second polarization. The first and second spectral bands can then be returned to the beam splitter at a different polarization than the incident light, and thus be separated geometrically from the incident light by reflecting off of the beam splitter.

The multiple, narrow spectral bands can then be directed to a dispersing element, such as a grating, to separate the spectral bands from each other, which can then be detected by an array of photodetectors, such as a CCD or the like.

Through use of multiple spectral filters, narrow spectral bands may be pre-selected and detected at high resolution, even if the pre-selected bands are spectrally distant. Further, use of a beam splitter allows for high resolution detection at a wide incidence angle variation.

In another embodiment, the second beam is also directed to the first or a separate spectral filter, and the polarization of its reflected first spectral band is rotated to the first polarization by the first or a separate polarization rotator. It can then be directed back to the first beam splitter and, due to its rotated polarization, transmitted through it. Thus, although the reflected spectral bands from the first and second beams may approach the beam splitter at different angles, they may combine at the beam splitter and travel in the same direction, one reflected and one transmitted. Such an arrangement may greatly increase the total signal power of the system over the prior art techniques using a beam splitter.

In another embodiment, the system includes the first beam splitter, the polarization rotator, and the first and second spectral filters as above. However, the first and second spectral filters are tilted relative to each other such that the second spectral band is reflected from the second spectral filter at a different angle than the first spectral band is reflected from the first spectral filter. The first and second spectral bands are directed back to the first beam splitter at a different angle from the incident light and at slightly different angles from each other. This embodiment allows automatic separation of the first and second spectral bands from each other as well as from the incident light, which allows for elimination of the dispersing element.

In another embodiment, the beam splitter, and first and second spectral filters are provided, as above. The first and second beams are directed to the first spectral filter at different angles, so the reflected spectral bands of the first and second beams are reflected at different angles towards the beam splitter. As the polarization is not rotated, the beam splitter transmits the spectral bands of the first beam and reflects the spectral bands of the second beam. The angles at which the first beam and the second beam are applied to the spectral filters can thus be determined so that the spectral bands of both the first beam and the second beam leave the beam splitter in the same direction. This embodiment can be used effectively separate narrow spectral bands from radiation with low divergence, such as from distant or small objects.

An embodiment of a method according to the invention includes applying incident light to a beam splitter at an incident angle. The beam splitter splits the incident light into a first incident beam with a first polarization and a second incident beam with a second polarization. The first incident beam is applied to a first spectral filter, which reflects a first spectral band of the first incident beam and transmits the remainder of the first incident beam. The remainder of the first incident beam is applied to a second spectral filter, which reflects a second spectral band of the first incident beam. The polarization of the first and second spectral bands is rotated to the second polarization. The first and second spectral bands are applied to the first beam splitter, which directs the first and second spectral bands at a different angle than the incident angle.

DETAILED DESCRIPTION

Figure 1:
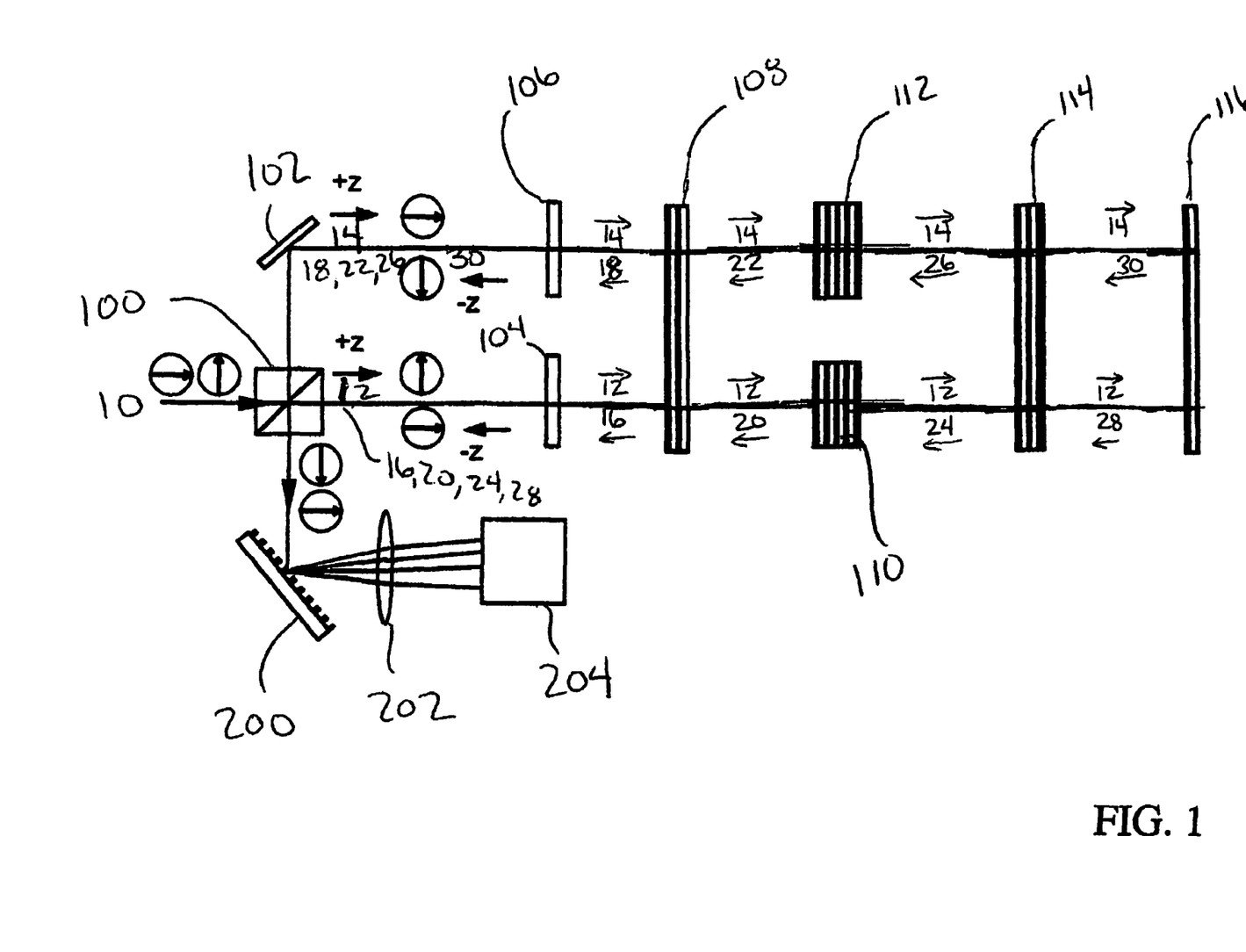
FIG. 1 shows an optical arrangement using a single unit polarization rotator, a dispersion element, and a CCD, according to a first embodiment of the present invention.

As is shown in FIG. 1, a beam splitter 100 receives incident light 10. The beam splitter 100 splits the unpolarized incident light 10 into two linear polarized components. Specifically, the beam splitter 100 transmits a portion of the incident light 10 with a first polarization, designated by the up arrow, as a first beam 12. The beam splitter 100 also reflects a portion of the incident light 10 with a second polarization, designated by the right arrow, as a second beam 14. The first beam 12 travels in a +Z direction toward a polarization rotator 104.

Figure 5:
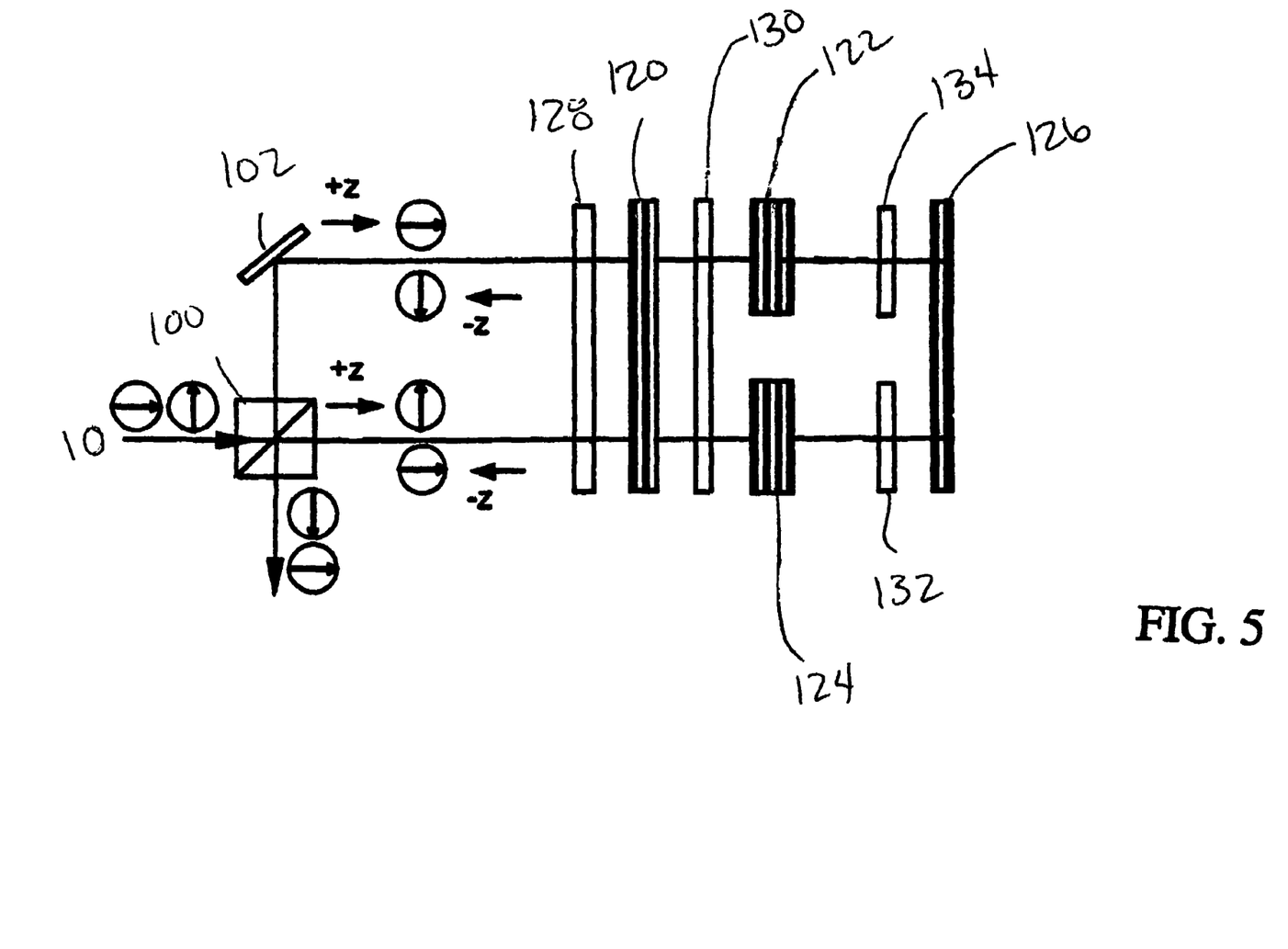
FIG. 5 shows yet another embodiment of an optical arrangement with multiple polarization rotators to compensate for rotation differences in bands that are spectrally distant.

In this embodiment, the second beam 14 is reflected off of a mirror 102 in a +Z direction toward a separate polarization rotator 106. Alternatively, a single, longer polarization rotator 128, as shown in FIG. 5, can be substituted for the two separate polarization rotators 104, 106. Further, any element capable of directing the second beam toward a polarization rotator 106 may be used in place of the mirror 102.

Still referring to FIG. 1, the first beam and the second beam continue toward a first spectral filter 108, which reflects a first particular spectral band 16, 18 from both the first and second beams, and transmits the remainders of the first and second beams 12, 14 to a second spectral filter layer 110, 112.

After reflecting from the first spectral filter 108, the first spectral band 16 of the first beam and the first spectral band 18 of the second beam travel in the −Z direction through the polarization rotators 104, 106, respectively. The polarization rotators rotate the first spectral bands, polarizations by 90 degrees. The first spectral band 16 of the first beam is rotated to the second polarization, designated by the right arrow. Likewise, the first spectral band 18 of the second beam is rotated to the first polarization, as shown by the down arrow.

The remainders of the first and second beams 12, 14 are received by the second spectral filter layer, made up of two spectral filters 110, 112. Spectral filters 110, 112, reflect a second particular spectral band 20, 22 from the first and second beams in the −Z direction. These second spectral bands 20, 22 then travel through polarization rotators 104, 106, respectively, which rotate their polarizations in the same manner as with the first spectral bands 16, 18, respectively.

Spectral filters 110, 112 also transmit the remainder of the first and second beams to a third spectral filter layer, made up of a single spectral filter 114. As shown in FIG. 1, spectral filter layers can be configured as a single unit, such as spectral filter 108, or alternately as two units, such as spectral filters 110 and 112. Additional layers of spectral filters, such as spectral filter 116, may be added to the system to filter additional pre-selected spectral bands. These additional spectral filter layers can operate substantially as described above.

The first, second, and any additional reflected spectral bands of the first beam 16, 20, 24, 28, travel back to the beam splitter 100 in the −Z direction after their polarizations have been rotated to the second polarization. Because the beam splitter 100 is configured to reflect beams with the second polarization, the spectral bands 16, 20, 24, 28 are reflected toward a dispersal element 200.

Likewise, the first, second, and any additional reflected spectral bands of the second beam 18, 22, 26, 30, travel back to the mirror 102 to be deflected toward the beam splitter 100 after their polarizations have been rotated to the first polarization. Because the beam splitter 100 is configured to transmit beams with the first polarization, the spectral bands 18, 22, 26, 30 are transmitted toward the dispersal element 200 along with the spectral bands of the first beam 16, 20.

The first spectral band 16, 18, is then geometrically separated from the second spectral band 20, 22, and any additional spectral bands 24, 26 and 28, 30 by the dispersal element 200, and directed through a lens 202 toward an array of photodetectors, such as CCD 204. The lens further geometrically separates the spectral bands so that each spectral band is detected by a different photodetector of the CCD 204.

The CCD 204 in this embodiment is thus capable of detecting several narrow bands of pre-selected wavelengths over a large desired spectral region. Further, this detection can be based on a high powered signal as the spectral bands are recombined before reaching the dispersal element. The beams are also directed at a substantially normal angle to the spectral filters, ensuring a high sensitivity of the filters. The separation of the incident light 10 based on polarization at the beam splitter also allows for sensitivity of the system at a wide range of incident light angles and polarizations. The embodiment shown also easily and completely separates the incident light 10 from the reflected light 16, 18, 20, 22, 24, 26, 28, 30.

The beam splitter 100 can be any system or device capable of separating a beam based on polarity, and directing the differently polarized beams in different directions. Examples of beam splitters include prisms, cubes, etc.

The spectral filters 108-116 shown in FIG. 1 are Bragg gratings (BGs), but any system or device able to separate a narrow spectral band from an incoming beam may be used.

Examples of equivalents are the combination of absorbing or interference filters with mirrors, reflecting back surface gratings, etc. The BGs in this embodiment are designed to reflect a selected wavelength or narrow-band spectral interval. Within this application, a "spectral band" may refer to a single wavelength or an interval of wavelengths. The bandwidth and central wavelength of each spectral interval can be adjusted by the proper choice of thickness and frequency of each BG, respectively. The diffraction efficiencies of BGs are defined by the value of refractive index modulation by well-known methods, as described in detail in H. Kogelnik, "Coupled Wave Theory For Thick Hologram Gratings," The Bell System Technical Journal, v. 48, pp. 2909-2945, 1969. As further described in Efimov et al., "High Efficiency Bragg gratings in photo-thermorefractive glass," Appl. Opt., v. 38, pp. 619-627, 1999, and Buse, et al., "Origin of thermal fixing in photorefractive lithium niobate crystals," Phys. Rev. B, 56, 1225-1235 (1997), materials of the BGs may now be chosen by well-known means so that the BGs are transparent for radiation reflected from other gratings, and no grating shadows the radiation from subsequent BGs. Additionally, the remainders of the beams 12, 14 pass the BGs without reflection, so the filter can operate under bright illumination conditions. Antireflection coatings on the BGs or matching liquids between the BGs can also be added to limit the noise and losses resulting from bright illumination.

The polarization rotators 104, 106 are shown in this embodiment to be single units that rotate polarization 90 degrees on the second pass of a beam. This type of polarization rotator is well-known in the art and is discussed in detail in Canadian Patent No. 2355993, filed Feb. 27, 2003. The polarization rotator, however, can be any element that can rotate the polarization of a beam of radiation, such as one or more quarter wave plates, Faraday rotators, polarization adjusters, or an equivalent device or combination.

If a quarter wave plate is used, the linear polarized beam becomes circular polarized after passing through the quarter wave plate toward the spectral filter. When the reflected beam travels through the quarter wave plate again, it becomes linear polarized, but its linear polarization is rotated 90 degrees.

Figure 2:
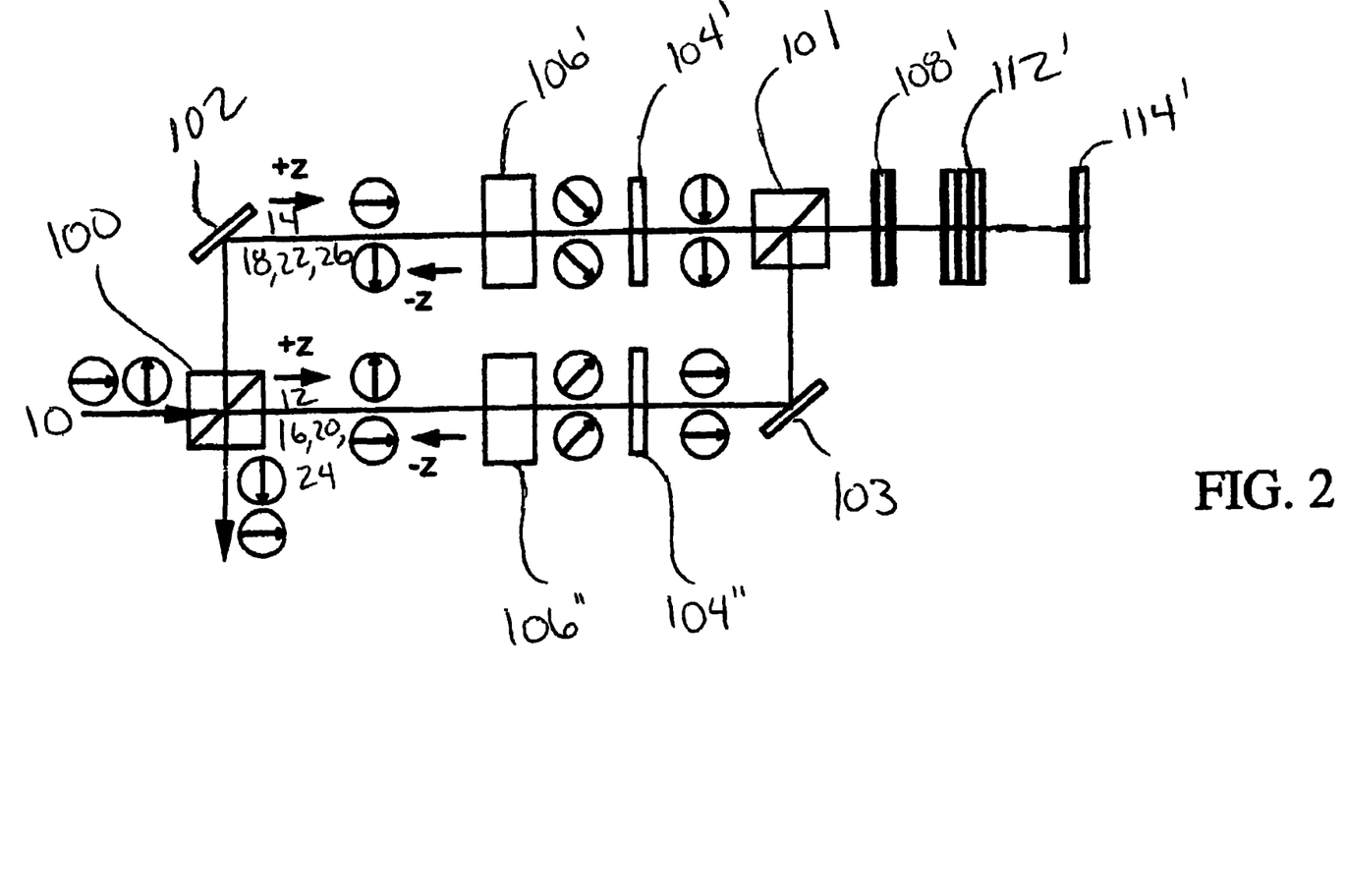
FIG. 2 shows an alternate embodiment of an optical arrangement using a multi unit polarization rotator and a second beam splitter.

FIG. 2 shows an alternate embodiment of an optical arrangement according to the invention. In this embodiment, an incident beam 10 enters the beam splitter 100 and is split into first and second beams 12, 14 with different polarizations, as discussed above. The second beam 14 is again deflected by mirror 102 into the +Z direction.

Both the first and second beams 12, 14, travel in the +Z direction through respective polarization rotators 104', 104", 106', 106", which, in this embodiment, rotate the beams' polarization 90 degrees on the way to the spectral filters. The first beam 12 is deflected upward by a second mirror 103 toward a second beam splitter 101. Because the beam splitter 101 is configured similarly to the beam splitter 100, the first beam 12 is reflected, as its polarization has been rotated to the second polarization. Similarly, the beam splitter 101 transmits the second beam 14, as its polarization has been rotated to the first polarization. Both the first and second beams 12, 14 are thus combined and directed to the same spectral filters, 108', 112', and 114'.

The reflected spectral bands 16-22, are then transmitted or reflected by the beam splitter 101 based on their polarizations, and they travel back along the same path as the first and second beams 12, 14.

When the reflected spectral bands 16, 18, 20, 22, pass through the polarization rotators 104', 104", 106', 106" a second time, their polarizations are rotated by 45 degrees and back again by 45 degrees, leaving the reflected spectral bands with a 90 degree polarization rotation relative to the first and second beams 12, 14.

The polarization rotators in this embodiment are in the form of Faraday rotators 106', 106" and polarization adjusters 104', 104". Faraday rotators and polarization adjusters are discussed in detail in J. Poirson, J. C. Cotteverte, A. L. Floch, and F. Bretenaker, "Internal reflections of the Gaussian beams in Faraday isolators." If a Faraday rotator and polarization adjuster are used as the polarization rotator, as shown in FIG. 2, the Faraday rotators 106', 106" rotate the linear polarization of the first and second beams 45 degrees on the first pass, and the polarization adjusters 104', 104" continue the rotation another 45 degrees on the way to the spectral filters. On a second pass through the polarization adjusters 104', 104" in the −Z direction, the polarization of the reflected beams are again rotated 45 degrees. The Faraday rotators then compensate this rotation and rotate the polarization back 45 degrees for a total 90 degree rotation.

Use of two mirrors 102, 103 and an additional beam splitter 101 in this embodiment allows the path lengths of the first and second beams 12, 14 to be substantially the same. This may be important when detecting short laser pulses to ensure temporal synchronization of pulses in both channels for a total reconstruction of pulses after the filter. Further, the use of a second beam splitter 101 allows smaller spectral filters 108'-114' to be used, as the spectral bands of both the first and second beams 12, 14 are reflected from the same area.

Figure 3:
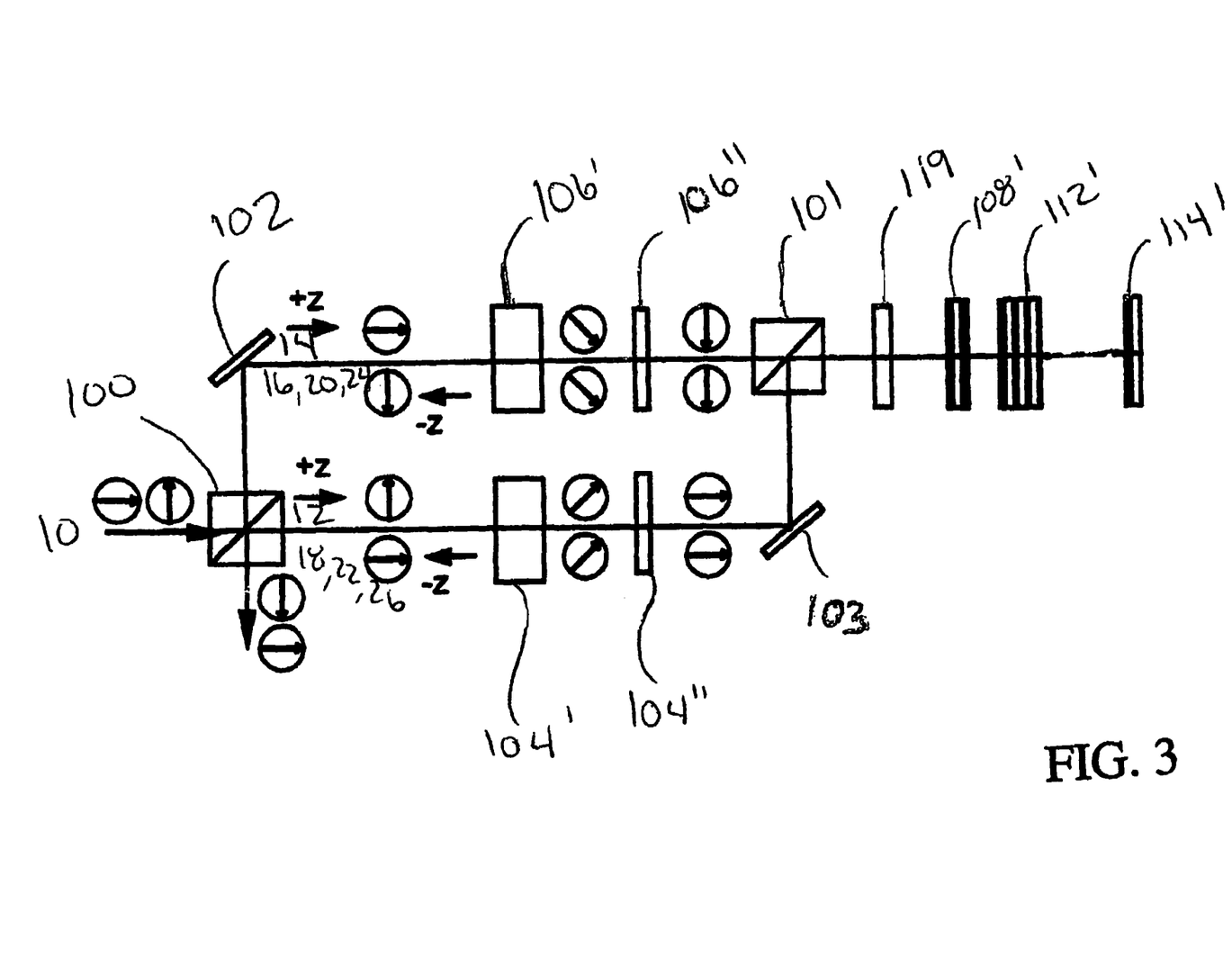
FIG. 3 shows yet another alternate embodiment of an optical arrangement that uses substantially equal path lengths for the first and second beams.

FIG. 3 shows a variation of the embodiment shown in FIG. 2, but further equalizes the path lengths of the first and second beams 12, 14 by rotating the polarization of each beam by an additional 45 degrees by a quarter wave plate 119 before the first and second beams 12, 14 arrive at the first spectral filter 108'. The polarization of the reflected spectral bands 16, 18, 20, 22, are then again rotated an additional 45 degrees when they return through the quarter wave plate 119.

Thus, after passing through the quarter wave plate twice, the reflected spectral bands 16, 20, 24 from the first beam again have the first polarization. Likewise, the reflected spectral bands 18, 22, 26 from the second beam again have the second polarization. The beam splitter 101 then transmits the reflected spectral bands 16, 20, 24 from the first beam in the −Z direction along the path originally taken by the second beam 14. The reflected spectral bands 18, 22, 26 from the second beam are reflected by the beam splitter 101 and the mirror 103 along the path originally taken by the first beam 12. The total path length of the first beam 12 and its reflected spectral bands 16, 20, 24 is therefore exactly identical to the total path length of the second beam 14 and its reflected spectral bands 18, 22, 26.

Figure 4:
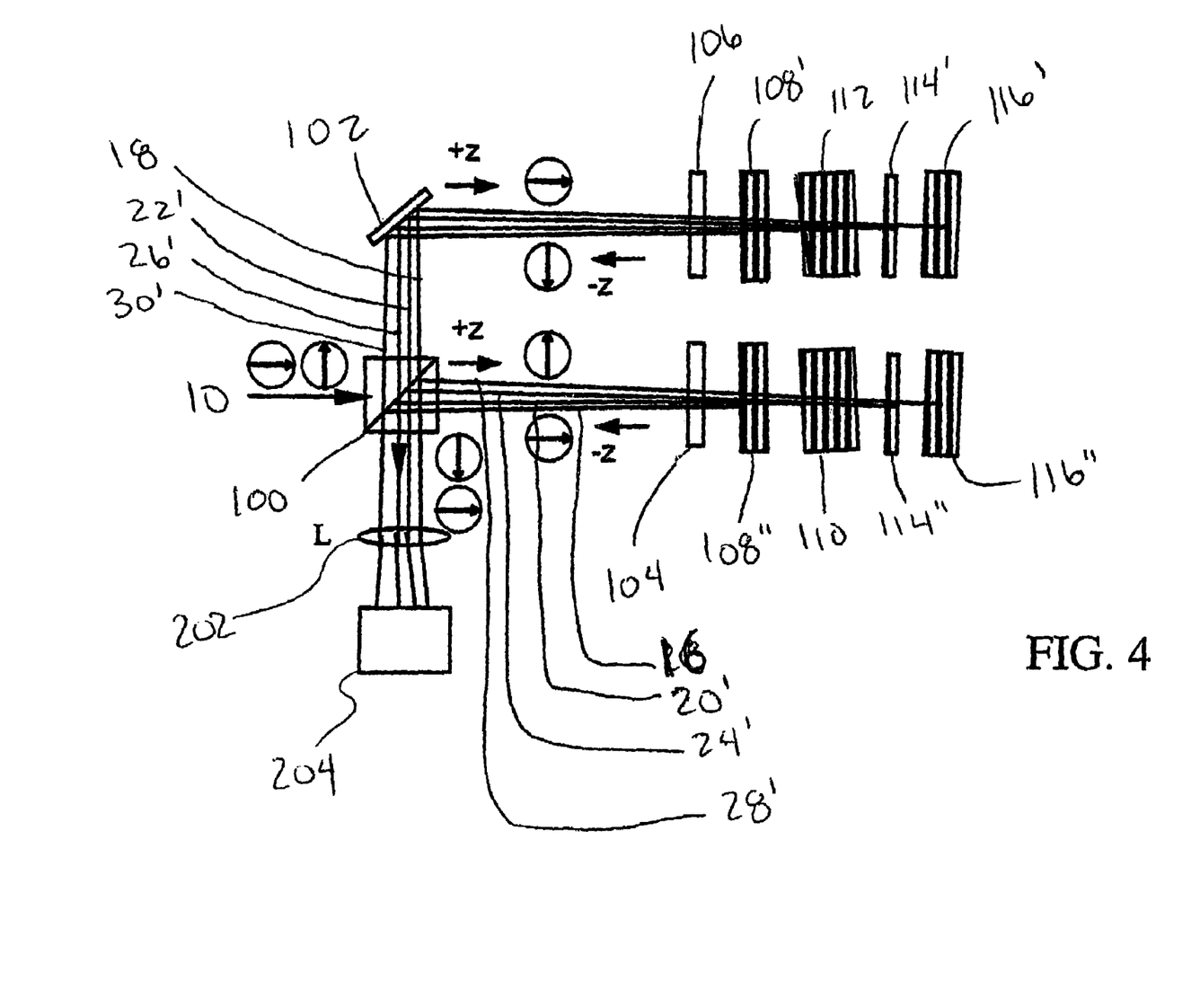
FIG. 4 shows another embodiment of an optical arrangement that includes tilted spectral filters.

An alternative to using the dispersal element 200 is shown in FIG. 4. In this embodiment, each spectral filter layer 108', 108", etc., has gratings at a slightly different angle from the other spectral filters. Therefore, each spectral filter layer reflects its respective spectral bands at a slightly different angle than the other layers. Therefore, the first reflected spectral bands 16, 18 from the first and second beams depart from the beam splitter 100 slightly displaced from the second reflected spectral bands 20', 22'. The same is true for the third and fourth spectral bands 24', 26' and 28', 30'.

The spectral bands are then further geometrically separated in the lens 202 and are separately detected by photodetectors in the CCD 204, as discussed above.

Polarization rotators can be spectrally sensitive, providing slightly different polarization rotation for different wavelengths. When the spectral bands reflected by sequential spectral filters are near each other on the spectrum, the polarization of the bands will be substantially the same. However, when the spectral bands are spectrally distant from each other, the polarization of the reflected bands may slightly vary.

When the pre-selected bands to be detected are spectrally distant from one another, the embodiment of FIG. 5 may be advantageous. The beam splitter 100, mirror 102, polarization rotator 128, and the spectral filters 120, 122, 124, 126 all operate as discussed above in the previous embodiments. However, additional polarization rotators 130, 132, 134 are placed between each spectral filter layer to correct the slight differences in polarization due to wavelength variations.

Figure 6:
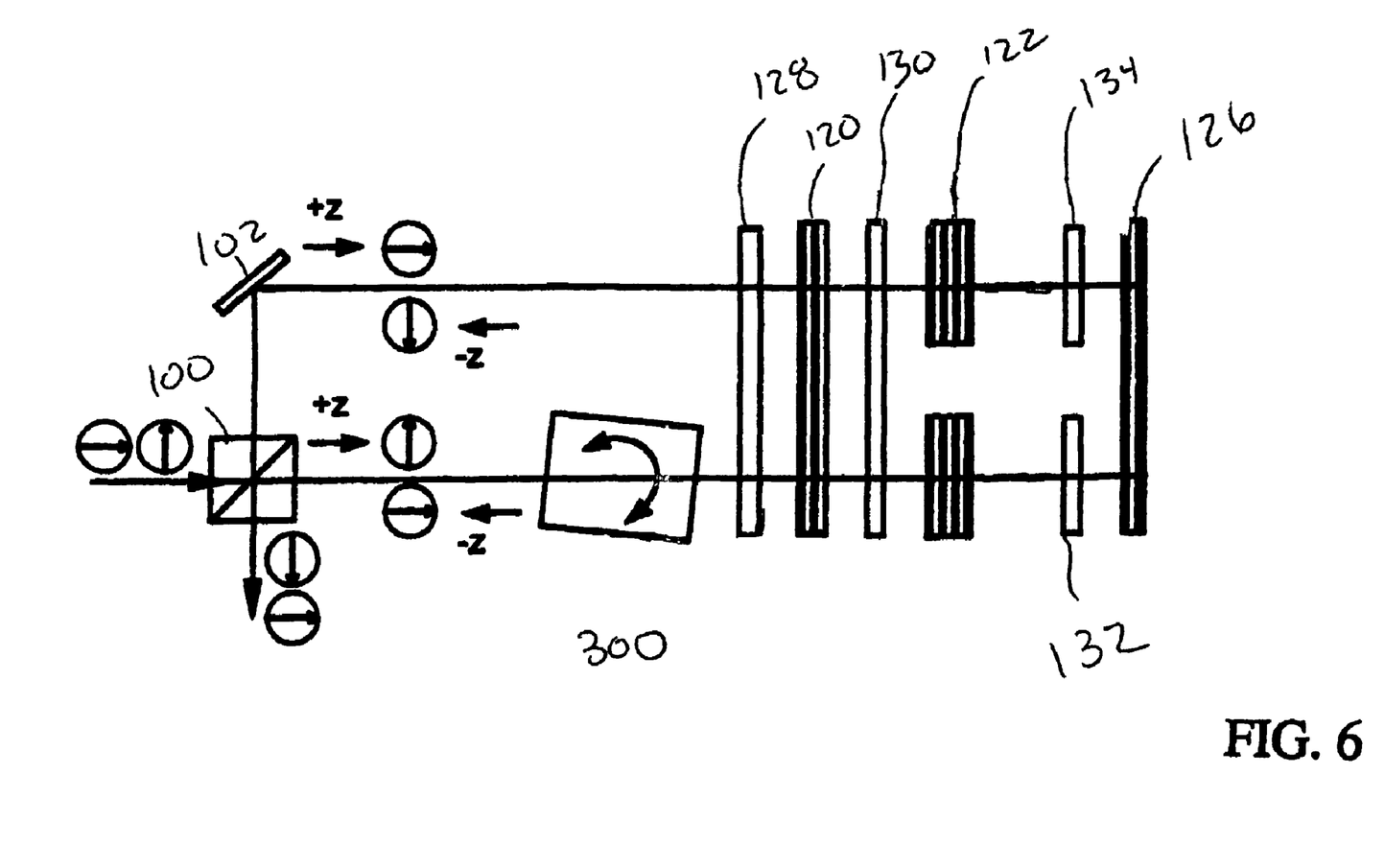
FIG. 6 shows an alternate embodiment for spectrally distant bands that includes an optical compensator.
Figure 7:
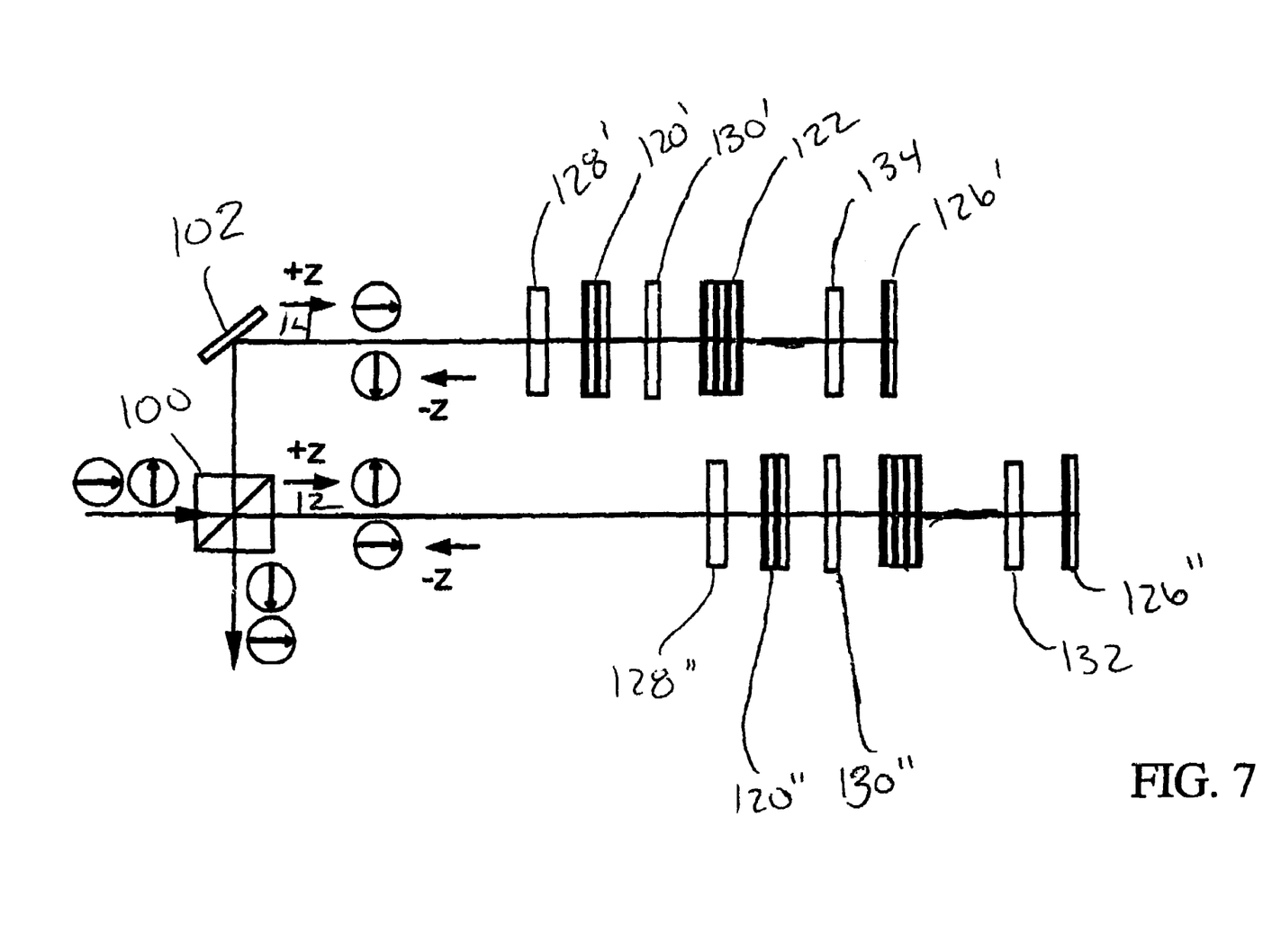
FIG. 7 shows yet another alternate embodiment for spectrally distant bands that includes equal path lengths for the first and second beams.

FIGS. 6 and 7 show modifications to this embodiment when synchronization of pulses is necessary. Referring to FIG. 6, the path length of the second beam 14 is longer than the path length of the first beam 12 due to the deflection of the mirror 102. To compensate for the longer path, an optical compensator 300, such as a thick, transparent plate, is added in the path of the first beam 12 and its reflected spectral bands.

Alternatively, as shown in FIG. 7, the path of the first beam 12 is lengthened to match that of the second beam 14. In this embodiment, the polarization rotators 128', 128'', 130', 130'', were substituted for the long, one-piece polarization rotators 128, 130 of FIG. 6. Likewise, spectral filters 120', 126' were substituted for the long, one-piece spectral filters 120, 126 of FIG. 6, to allow for the longer path of the first beam 12.

Figure 8:
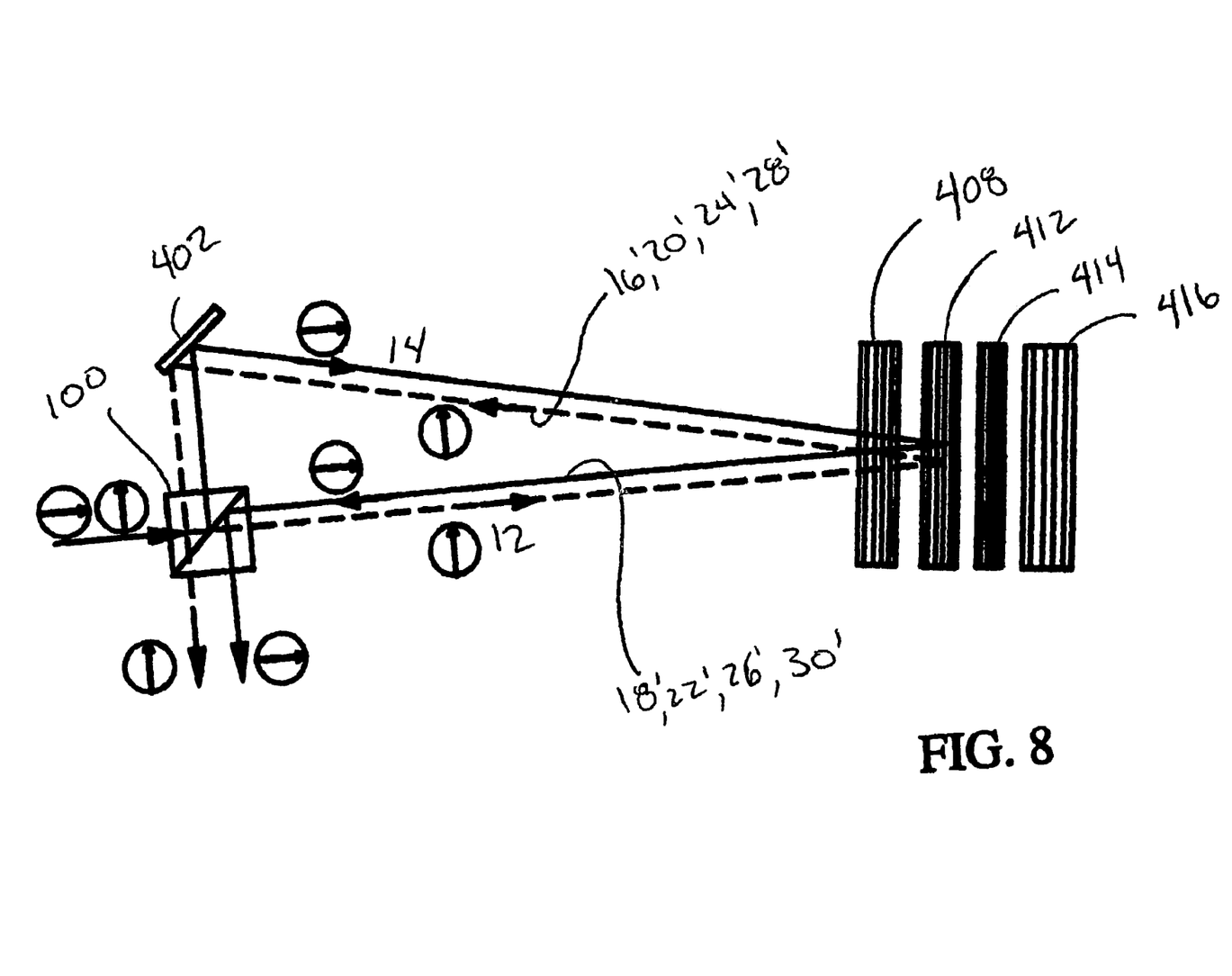
FIG. 8 shows an embodiment of an optical arrangement for filtering low divergence radiation.
Figure 9:
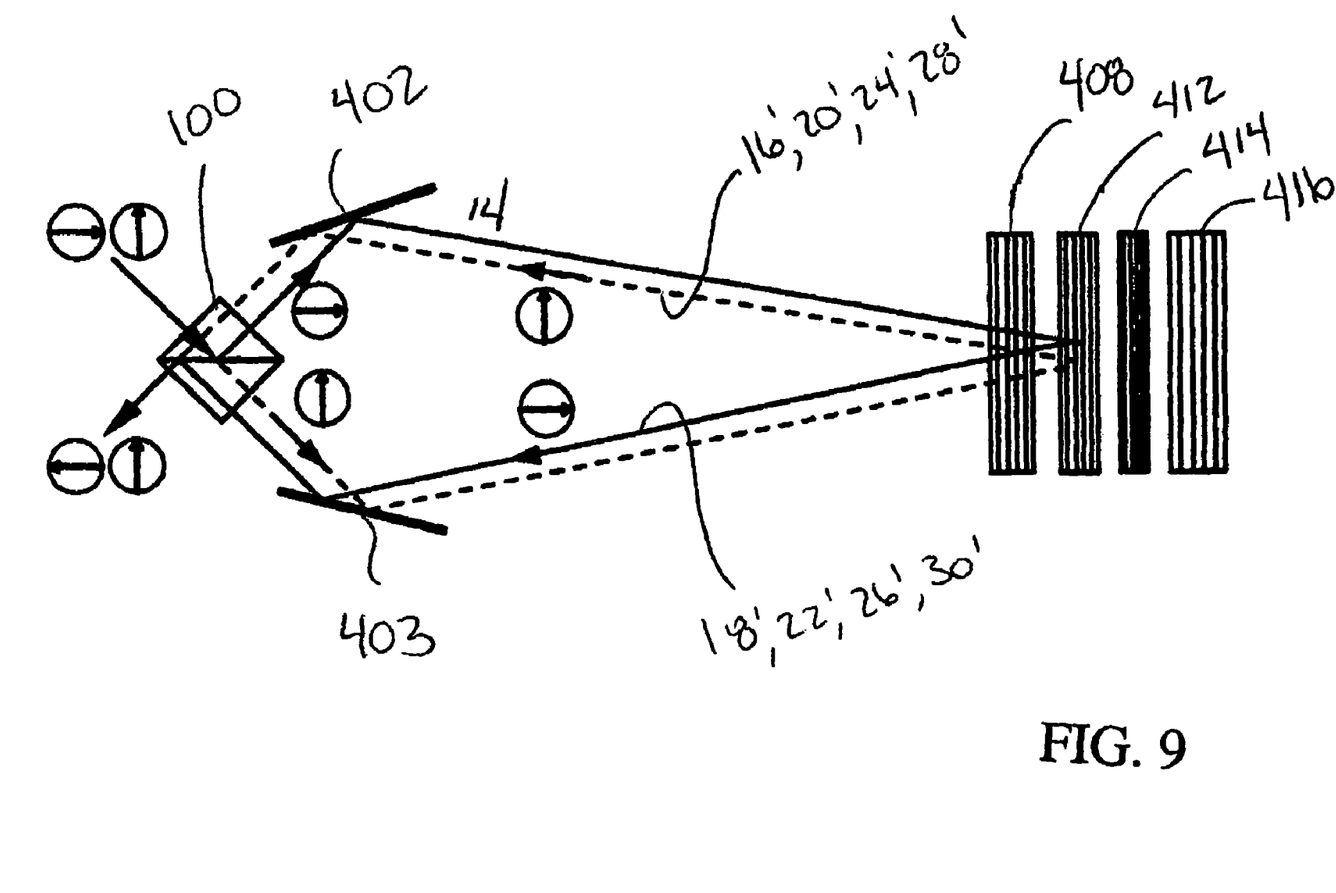
FIG. 9 shows a alternate embodiment of an optical arrangement for filtering low divergence radiation.

FIGS. 8 and 9 relate to analysis of radiation with a low divergence, such as from distant or small objects. Referring to FIG. 8, incident light 10 is split by beam splitter 100, as above, into the first beam 12, shown with a dotted line, and the second beam 14, shown with a solid line. Mirror 402 reflects the second beam 14 onto the spectral filters 408, 412, 414, 416, which are provided at an angle relative to the first and second beams 12, 14, so that the reflected spectral bands 16'-30' are reflected at a different angles than the first and second beams.

As shown, the first beam 12 with the first polarization is transmitted from the beam splitter 100 toward the spectral filters 408, 412, 414, 416. The spectral filters 408, 412, 414, 416 reflect spectral bands 16', 20', 24', 28', respectively in a counterclockwise direction toward the mirror 402. The mirror 402 deflects spectral bands 16', 20', 24', 28' toward the beam splitter, which again transmits the bands, as their polarizations are not rotated, as in the earlier embodiments. The second beam 14 and its reflected spectral bands 18', 22', 26', 30' follow a clockwise path. When the spectral bands 18', 22', 26', 30' return to the beam splitter 100, they are reflected toward the same direction as the spectral bands of the first beam.

The advantage of this design is that no polarization rotators or polarization adjusters are needed to maintain high signal power and high resolution detection of spectrally distant bands. Further, this design can ensure the same optical path for both the first and second beams reflected by the same spectral filter and can be used for detection of short laser pulses.

The spectral bands from the first beam 16', 20', 24', 28' exiting the beam splitter 100 after reflection experience small, different displacements from the spectral bands from the second beam 18', 22', 26', 30', respectively, due to differences in positions of filters 408, 412, 414, 416 with respect to the beam splitter 100 and the first and second beams. To avoid this displacement, the configuration shown in FIG. 9 can be used. In this embodiment, the first beam 12 is also deflected by a mirror 403 toward the spectral filters 408, 412, 414, 416. By symmetrically arranging the elements in the optical arrangement, the displacement of the spectral bands exiting the beam splitter 100 can be eliminated.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents.

What is claimed is:

1. An optical arrangement comprising:
    a first beam splitter adapted to transmit light of a first polarization to provide a first beam, and reflect light of a second polarization to provide a second beam;
    a first spectral filter adapted to receive the first beam, reflect a first spectral band of the first beam, and transmit the remainder of the first beam;
    a second spectral filter adapted to receive the remainder of the first beam and to reflect a second spectral band of the first beam; and
    a first polarization rotator adapted to rotate the polarization of the first spectral band and the second spectral band to the second polarization.

2. The optical arrangement of claim 1, wherein the first beam splitter is adapted to receive and reflect the first spectral band and the second spectral band.

3. The optical arrangement of claim 2, further comprising:
    a dispersive spectral element for receiving the first spectral band and the second spectral band from the first beam splitter; and
    an array of photodetectors for receiving the first spectral band and the second spectral band from the dispersive spectral element.

4. The optical arrangement of claim 1, wherein the first spectral filter is adapted to reflect the first spectral band at a first angle and the second spectral filter is adapted to reflect the second spectral band at a second angle that is different from the first angle.

5. The optical arrangement of claim 4, wherein the first beam splitter is adapted to receive and reflect the first spectral band and the second spectral band at different angles to be received by an the array of photodetectors.

6. The optical arrangement of claim 1, further comprising a second polarization rotator between the first spectral filter and the second spectral filter for rotating the polarization of the second spectral band.

7. The optical arrangement of claim 1, wherein the first spectral filter is adapted to receive the second beam and to reflect a first spectral band of the second beam.

8. The optical arrangement of claim 7, further comprising:
    a second beam splitter between the first polarization rotator and the first spectral filter adapted to receive and reflect the first beam, receive and transmit the second beam, and receive the first spectral band of the first beam and the first spectral band of the second beam; and
    a second polarization rotator for rotating the polarization of the first spectral band of the first beam and the first spectral band of the second beam, such that the first spectral band of the first beam is received and transmitted by the second beam splitter and the first spectral band of the second beam is received and reflected by the second beam splitter.

9. The optical arrangement of claim 7, wherein the first polarization rotator is adapted to rotate the polarization of the first spectral band of the second beam to the first polarization.

10. The optical arrangement of claim 7, further comprising a second polarization rotator adapted to rotate the polarization of the first spectral band of the second beam to the first polarization.

11. The optical arrangement of claim 7, wherein the path lengths of the first beam and the second beam to the first spectral filter are substantially the same.

12. The optical arrangement of claim 7, further comprising an optical compensator in optical alignment with the first spectral band of the first beam, the first spectral band of the second beam, or both.

13. The optical arrangement of claim 1, further comprising:
a third spectral filter adapted to receive the second beam and to reflect a first spectral band of the second beam; and
a second polarization rotator adapted to rotate the polarization of the first spectral band of the second beam to the first polarization.

14. The optical arrangement of claim 13, wherein the path length of the first beam to the first spectral filter is substantially the same as the path length of the second beam to the third spectral filter.

15. The optical arrangement of claim 13, further comprising an optical compensator in optical alignment with the first spectral band of the first beam, the first spectral band of the second beam, or both.

16. The optical arrangement of claim 1, wherein at least one of the first spectral filter or the second spectral filter is a Bragg grating.

17. An optical arrangement comprising:
a first beam splitter adapted to transmit light of a first polarization to provide a first beam, and reflect light of a second polarization to provide a second beam;
a first spectral filter adapted to receive the second beam, reflect a first spectral band of the second beam, and transmit the remainder of the second beam;
a second spectral filter adapted to receive the remainder of the second beam and to reflect a second spectral band of the second beam; and
a first polarization rotator adapted to rotate the polarization of the first spectral band to the first polarization.

18. An optical arrangement comprising:
a first beam splitter adapted to transmit light of a first polarization to provide a first beam, and reflect light of a second polarization to provide a second beam;
a first mirror adapted to reflect one of the first beam or the second beam;
a first spectral filter adapted to receive the first beam at a first angle, reflect a first spectral band of the first beam at a second angle, and transmit the remainder of the first beam, wherein the first spectral filter is further adapted to receive the second beam at a third angle, reflect a first spectral band of the second beam at a fourth angle, and transmit the remainder of the second beam;
a second spectral filter adapted to receive the remainder of the first beam and reflect a second spectral band of the first beam at substantially the second angle, wherein the second spectral filter is further adapted to receive the remainder of the second beam and reflect a second spectral band of the second beam at substantially the fourth angle,
wherein the first beam splitter is further adapted to receive and transmit the first spectral band and the second spectral band of the first beam and to receive and reflect the first spectral band and the second spectral band of the second beam.

19. The optical arrangement of claim 18, further comprising a second mirror adapted to reflect the other of the first beam or the second beam.

20. The optical arrangement of claim 19, wherein the path of the first beam to the first spectral filter is substantially the same as the path of the second beam to the first spectral filter.

21. A filtering method comprising:
applying incident light to a beam splitter at an incident angle, the beam splitter splitting the incident light into a first incident beam having a first polarization and a second incident beam having a second polarization in response thereto;
applying the first incident beam to a first spectral filter, said filter reflecting a first spectral band of the first incident beam in response thereto, and transmitting the remainder of the first incident beam;
applying the remainder of the first incident beam to a second spectral filter, said filter reflecting a second spectral band of the first incident beam in response thereto;
rotating the polarization of the first spectral band and the second spectral band to the second polarization; and
applying the first spectral band and the second spectral band to the first beam splitter, the beam splitter directing the first spectral band and the second spectral band at a different angle than the incident angle.

\* \* \* \* \*